239-689

FIP: 01/98 OR SR RE03339

Sheet 1, 2 Sheets.

G. W. Van Brunt.

Seeding Mach.

No. 3,339. Reissued Mar. 23, 1869.

Witnesses.
James R. Cudlip
J. H. Hamberschmidt

Inventor.
G. W. Van Brunt

G. W. Van Brunt.
Seeding Mach.
No. 3,339.
Reissued Mar. 23, 1869.
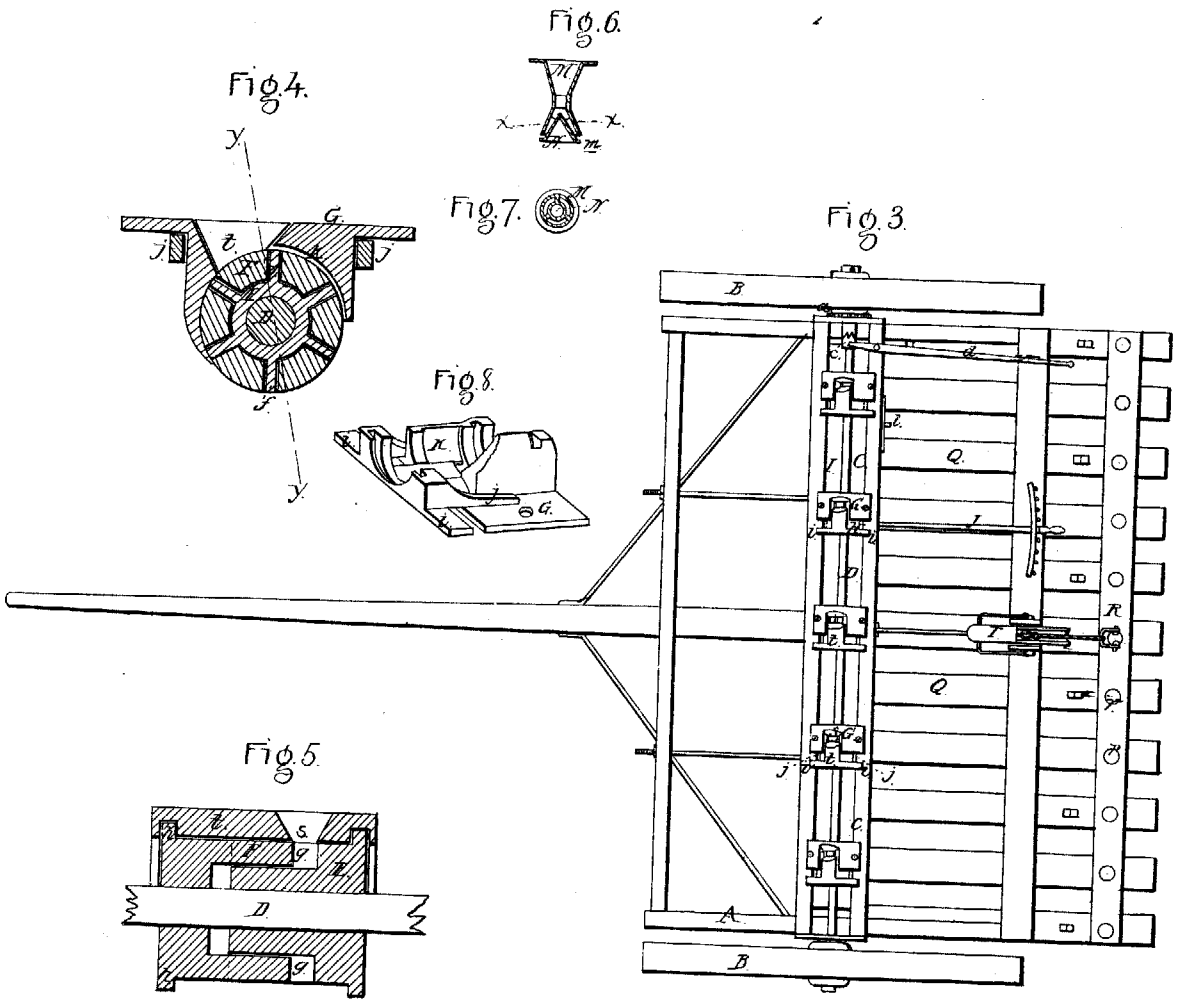
Witnesses:
James H. Gurley
J. H. Taubenschmidt
Inventor:
G. W. Van Brunt
N. PETERS, PHOTO-LITHOGRAPHER, WASHINGTON, D. C.

UNITED STATES PATENT OFFICE.

G. W. VAN BRUNT, D. C. VAN BRUNT, AND HIRAM BARBER, OF HORICON, WISCONSIN, ASSIGNEES OF G. W. VAN BRUNT.

IMPROVEMENT IN SEEDING-MACHINES.

Specification forming part of Letters Patent No. 35,960, dated July 22, 1862; Reissue No. 3,339, dated March 23, 1869.

*To all whom it may concern:*

Be it known that GEO. W. VAN BRUNT, of Horicon, Dodge county, in the State of Wisconsin, hath invented a new and Improved Seeding-Machine; and that we, GEO. W. VAN BRUNT, D. C. VAN BRUNT, and HIRAM BARBER, all of the same place, assignees of the said VAN BRUNT, do hereby declare that the following is a full, clear, and exact description of the same, reference being had to the accompanying drawings, making a part of this specification, in which—

Figure 1:
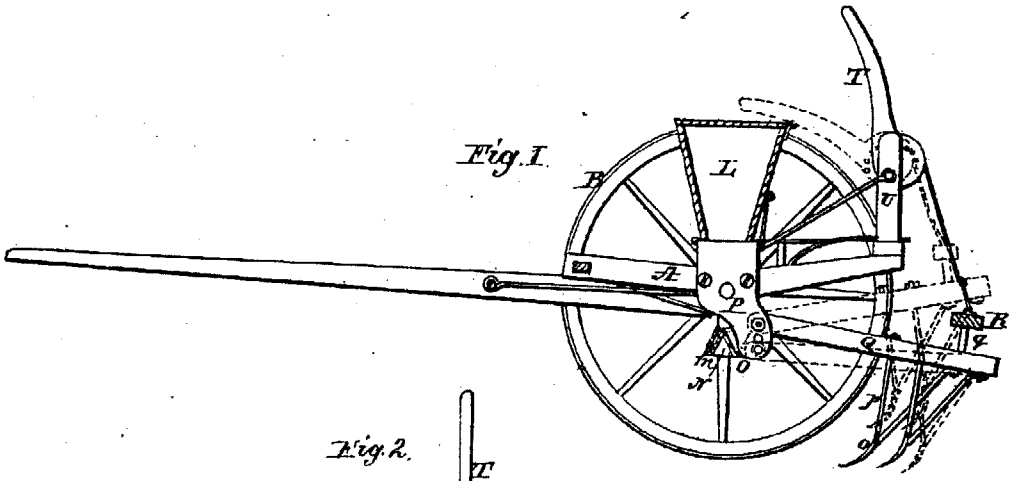
Figure 2:
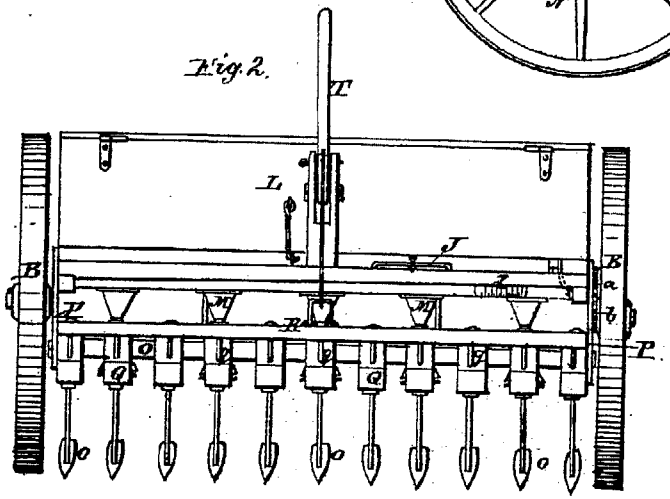

Figure 1 is a side elevation of the improved seeding-machine with the nigh wheel removed. Fig. 2 is a rear end elevation of the same. Fig. 3 is a plan of the same with the seed-hopper removed. Fig. 4 is a transverse section of the seed-cylinder and cap. Fig. 5 is a longitudinal section of one of the caps and cylinders, taken in line *y y* of Fig. 4. Fig. 6 is a vertical central section of one of the tubes. Fig. 7 is a horizontal section of the same, the section being taken in the line *x x* of Fig. 6. Fig. 8 is a perspective view of one of the caps inverted.

Similar letters of reference indicate corresponding parts in the several figures.

This invention relates to that class of seeding-machines in which a series of seed-cylinders is employed, arranged on a revolving shaft, and each cylinder provided with radial flanges, or, in other words, with flanges projecting from its convex surface, and extending parallel to the axis of the cylinder.

The invention consists in combining such a cylinder with a cap or cover provided with a chambered recess on its concave side, concentric with the cylinder, and extending from the front edge of the feed-opening in the cap forward and downward to the edge of the cap itself, whereby such seed as may chance to lodge on top of the partitions or flanges forming the seed cells or pockets is prevented from being crushed or bruised between the partition and the inner bottom edge of the opening in the caps while the seed-cylinders are in motion.

It also consists in a peculiar construction of scattering device, as hereinafter set forth.

To enable others skilled in the art to fully understand and use the invention, we will proceed to describe its construction and operation.

A represents a rectangular frame, which is mounted on two wheels, B B, and has a box, C, placed on it extending its whole width.

Within the box C there is placed a shaft, D, which has a pinion, *a*, fitted loosely on one end and gearing into a wheel, *b*, attached concentrically to one of the wheels B. The hub of the pinion *a* protrudes through the box on its inner side, and on its inner end is provided with the ratchet-teeth, which engage with corresponding teeth of a sliding sleeve, *c*, when the seeding device is in gear, said sleeve *c* being moved longitudinally on the shaft to throw the seeding device in or out of gear by means of a lever, *d*.

On the shaft D there is secured a series of cylinders, E, which may be described as being cylinders provided with radial flanges *f*, the spaces *g* between which form seed cells or pockets. Each cylinder E has a shell or hollow cylinder, F, fitted on it. These shells or cylinders F are slotted longitudinally to receive the flanges *f* of the cylinders E, the parts of the shells between the slots fitting snugly in the spaces *g* between the flanges *f* of the cylinders, as shown in Fig. 4.

The shells or hollow cylinders F are each provided with a flange, *h*, at their outer ends, and these flanges are fitted to revolve in corresponding grooves in the under side of a cap, which is formed in two parts, G H, fitted together with a tongue and groove. The part G, in which the groove *s* is formed, is secured to the box C, and the part H, on which the tongue *t* is formed, is fitted to slide longitudinally with the hollow cylinder F, on the shaft D, and is supported in a proper position and guided in its movement by means of its flanges *i i'* and laterally-projecting arms *j j*, (shown in Figs. 3 and 8,) which latter embrace the two opposite sides of the fixed cap G. The groove *s* in the cap G is made in it back of a line drawn perpendicularly through the center of the cylinders, and has downwardly-converging sides.

On the under side of the cap G, in front of the groove *s*, is a chambered recess *k*, (shown in Fig. 4,) concentric with the axis of the cylinders. This chambered recess is to prevent the possibility of any seed which may lodge on the tops of the radial flanges *f* of the cylinders from being crushed or bruised in passing under the cap, and the groove or opening *s* through the cap, through which the seed passes from the hopper to the seed-cells of the cylinders E, the opening through the cap being forward of a line drawn perpendicularly through the center of the cylinder, effectually prevents any tendency of the seed to run out through the chambered recess. The flanges of the hollow cylinders F below the axle D run between two flanges of plates (not seen in the drawings) attached to a slide, I, which is moved or actuated by means of a lever, J, and by this movement of the slide the series of cylinders F may be moved a greater or less distance on the cylinders E, and the capacity of the seed cells or pockets thereby varied, as circumstances may require, an index, *l*, (shown in Fig. 2,) extending rearwardly from the slide I, indicating on a graduated plate the size of the seed-cells, and consequently the quantity of seed the machine is set to sow on a given area of ground.

Directly over the box C there is placed a seed box or hopper, L, the bottom of which is perforated immediately over the cylinders on shaft D. Inside the hopper sunken cavities or depressions are formed in the bottom immediately surrounding the perforations.

To the under side of the box C a series of pendent tubes, M, which may be described as two truncated hollow cones united together at their small ends, are attached to the box C, directly under the cylinders. In the lower part of each tube there is a cone, N, provided at its lower end with a circular flange, *m*. The cones N are smaller in diameter than the interior of the tubes M, and a space is consequently left between them for the discharge of seed. The cones are attached in the tubes by a web of cast-iron, the tube and cone being cast together. (Shown by a horizontal section in Fig. 6.)

The machine being thrown in gear and set in motion, the seed runs through the perforations in the bottom of the hoppers and fills the seed cells or pockets of the cylinders as they are successively brought under the openings. The quantity of seed to be sown on a given surface or area of ground may be varied by adjusting the slide I, so that the shells or hollow cylinders F may be adjusted a greater or less distance apart on the cylinders E, and the seed cells or pockets varied in capacity, as required. The seed drops from the cells into the tubes M and falls on the cones N, and is discharged from the lower ends of the tubes in a scattering or broadcast state, the form or shape of the tubes, in connection with the cones N and flanges *m*, effecting such result.

O is a shaft, the ends of which are fitted in bearings in plates P, attached on each side of the frame, and on this shaft O there is placed loosely a series of drag-bars, Q, in the back ends of which cultivator or harrow teeth *o* are attached by their standards *p*, which pass up through the bars and are secured by tapering keys driven in behind them, and are braced by rods. The bars Q are allowed to turn freely on the shaft O, and are kept a proper distance apart by collars, which are placed on the shaft between the bars. By changing the ends of the shaft O in the different bearings or holes in the plate P the bars are raised or lowered and the pitch of the teeth accordingly varied, as may be desired. The back end of each drag-bar Q has a pin, *q*, projecting at right angles from its surface, and these pins pass loosely through the cross-bar R and have heads on their upper ends. The bar R is connected by a cord or chain to an eccentric-lever, T, fulcrumed in a standard, U, on the back part of the frame. The pins *q* are of sufficient length to admit of each bar Q rising and falling to a certain extent independently of the others, and by means of the lever T the whole number of bars may be lifted simultaneously above the surface of the ground. The teeth *o* harrow in the seed and pulverize the soil behind the tubes.

Having thus described the invention, what we claim as new, and desire to secure by Letters Patent, is—

1. The concentric chambered recess *k* in the cap G, in combination with a cylinder, E, having radial flanges *f f*, when arranged to operate in the manner and for the purpose set forth.

2. The cones N, having a horizontal circular flange, *m*, at their lower ends, in combination with the peculiarly-shaped tubes M, when constructed in the manner specified.

G. W. VAN BBUNT.
D. C. VAN BRUNT.
HIRAM BARBER.

Witnesses:
J. F. RANDOLPH,
J. B. BIRGE.